(12) United States Patent
Gaylo et al.

(10) Patent No.: US 10,669,196 B2
(45) Date of Patent: Jun. 2, 2020

(54) METHODS FOR TREATING GLASS ARTICLES

(71) Applicant: CORNING INCORPORATED, Corning, NY (US)

(72) Inventors: Keith Raymond Gaylo, Painted Post, NY (US); Lewis Kirk Klingensmith, Corning, NY (US); Robert Anthony Schaut, Painted Post, NY (US); Steven Alvin Tietje, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 290 days.

(21) Appl. No.: 15/541,238

(22) PCT Filed: Dec. 30, 2015

(86) PCT No.: PCT/US2015/068104
§ 371 (c)(1),
(2) Date: Jun. 30, 2017

(87) PCT Pub. No.: WO2016/109693
PCT Pub. Date: Jul. 7, 2016

(65) Prior Publication Data
US 2018/0002224 A1    Jan. 4, 2018

Related U.S. Application Data

(60) Provisional application No. 62/098,706, filed on Dec. 31, 2014.

(51) Int. Cl.
*C03C 23/00* (2006.01)
*C03C 21/00* (2006.01)
(Continued)

(52) U.S. Cl.
CPC ............. *C03C 23/007* (2013.01); *A61J 1/065* (2013.01); *C03B 23/114* (2013.01); *C03B 29/02* (2013.01);
(Continued)

(58) Field of Classification Search
CPC . A61J 1/00; A61J 1/062–1/065; C03C 23/007
See application file for complete search history.

(56) References Cited

U.S. PATENT DOCUMENTS 1,540,264 A    6/1925    Henry
1,585,542 A    5/1926    Henry
(Continued)

FOREIGN PATENT DOCUMENTS

CA    2877742 A1    1/2014
CA    2888831 A1    6/2014
(Continued)

OTHER PUBLICATIONS

English Translation of Taiwan Search Report dated Feb. 19, 2019 for TW Patent Application No. 104144738 filed Dec. 31, 2015. p. 1.
(Continued)

*Primary Examiner* — Erin Snelting
(74) *Attorney, Agent, or Firm* — Dinsmore & Shohl LLP

(57) ABSTRACT

Methods for increasing the hydrolytic resistance of a glass article are disclosed. According to one embodiment, the method includes providing a glass article with a pre-treatment hydrolytic titration value. Thereafter, the glass article is thermally treated at a treatment temperature greater than a temperature 200 C less than a strain temperature of the glass article for a treatment time greater than or equal to about 0.25 hours such that, after thermally treating the glass
(Continued)

US 10,669,196 B2

Page 2 article, the glass article has a post-treatment hydrolytic titration value that is less than the pre-treatment hydrolytic titration value.

17 Claims, 8 Drawing Sheets

(51) Int. Cl.
  *A61J 1/06*   (2006.01)
  *C03B 29/02*  (2006.01)
  *C03B 23/11*  (2006.01)
  *C03B 25/02*  (2006.01)
  *G01N 31/16*  (2006.01)

(52) U.S. Cl.
  CPC .......... *C03B 29/025* (2013.01); *C03C 21/008* (2013.01); *C03B 23/11* (2013.01); *C03B 25/025* (2013.01); *G01N 31/166* (2013.01)

(56) References Cited

U.S. PATENT DOCUMENTS

| | | | |
|---|---|---|---|
| 1,974,058 | A | 9/1934 | Wadman |
| 3,348,934 | A | 10/1967 | Hinson et al. |
| 3,524,737 | A | 8/1970 | Doyle et al. |
| 4,481,025 | A | 11/1984 | Rodriguez et al. |
| 6,114,039 | A | 9/2000 | Rifqi |
| 6,595,029 | B1 | 7/2003 | Dick et al. |
| 6,810,688 | B1 | 11/2004 | Duisit et al. |
| 8,232,218 | B2 | 7/2012 | Dejneka et al. |
| 8,596,094 | B2 | 12/2013 | Duran et al. |
| 9,796,615 | B2 * | 10/2017 | Moseler ............... C03B 23/112 |
| 2004/0129026 | A1 | 7/2004 | Bartsch |
| 2004/0221615 | A1 | 11/2004 | Postupack et al. |
| 2006/0293162 | A1 | 12/2006 | Ellison |
| 2007/0141349 | A1 | 6/2007 | Hessenkemper et al. |
| 2008/0206494 | A1 | 8/2008 | Kurachi et al. |
| 2009/0220761 | A1 | 9/2009 | Dejneka et al. |
| 2009/0286091 | A1 | 11/2009 | Danielson et al. |
| 2010/0162759 | A1 | 7/2010 | Duran et al. |
| 2010/0255229 | A1 | 10/2010 | Wada |
| 2010/0300535 | A1 | 12/2010 | Aitken et al. |
| 2010/0300536 | A1 | 12/2010 | Aitken et al. |
| 2011/0003483 | A1 | 1/2011 | Nishizawa et al. |
| 2011/0159219 | A1 | 6/2011 | Yue et al. |
| 2011/0265516 | A1 | 11/2011 | Allan et al. |
| 2012/0085130 | A1 | 4/2012 | Hill et al. |
| 2013/0101596 | A1 | 4/2013 | DeMartino et al. |
| 2013/0101764 | A1 | 4/2013 | Schaut et al. |
| 2013/0225390 | A1 | 8/2013 | Ellison et al. |
| 2013/0260154 | A1 | 10/2013 | Allan et al. |
| 2013/0327740 | A1 * | 12/2013 | Adib ..................... C03C 3/087 215/379 |
| 2014/0087193 | A1 | 3/2014 | Cites et al. |
| 2014/0150499 | A1 | 6/2014 | Danielson et al. |
| 2014/0151371 | A1 | 6/2014 | Chang et al. |
| 2016/0016841 | A1 * | 1/2016 | Frost ..................... C03B 21/06 65/29.1 |

FOREIGN PATENT DOCUMENTS

| | | |
|---|---|---|
| CN | 103204622 A | 7/2013 |
| CN | 105008297 A | 10/2015 |
| DE | 19812056 C1 | 10/1999 |
| DE | 102007028543 A1 * | 3/2008 ............ C03C 4/085 |
| EP | 2977358 A1 | 1/2016 |
| EP | 1874699 B1 | 12/2018 |
| ES | 2026422 A6 | 4/1992 |
| GB | 966735 A | 8/1964 |
| GB | 1509644 A | 5/1978 |
| JP | H01201048 A | 8/1989 |
| JP | 2003040634 A | 2/2003 |
| JP | 2010243091 A | 10/2010 |
| JP | 2013173668 A | 9/2013 |
| RU | 2151108 C1 | 6/2000 |
| RU | 2324665 C2 | 5/2008 |
| RU | 2496725 C1 | 10/2013 |
| SU | 1551665 A1 | 3/1990 |
| TW | 201141802 A1 | 12/2011 |
| WO | WO01/038249 A1 | 5/2001 |
| WO | 2004094329 A1 | 11/2004 |
| WO | 2012048293 A2 | 4/2012 |
| WO | WO-2012041473 A1 * | 4/2012 ........... C03C 23/007 |
| WO | 2013145503 A1 | 10/2013 |
| WO | 2013185018 A1 | 12/2013 |
| WO | 2014005030 A1 | 1/2014 |

OTHER PUBLICATIONS

English Translation of Russian 1st Office Action & Search Report dated May 7, 2019, for RU Patent Application No. 20171254. pp. 1-13.
International Search Report & Written Opinion dated Mar. 11, 2016 for International Patent Application No. PCT/US2015/068104 filed Dec. 30, 2015. pp. 1-13.
International Search Report & Written Opinion dated Mar. 15, 2016 for International Patent Application No. PCT/US2015/068108 filed Dec. 30, 2015. pp. 1-13.
Mallick et al., "Strengthening of container glasses by ion-exchange dip coating"; Journal of Non-Crystalline Solids 351 (2005) 2524-2536; pp. 2524-2536.
Jiang, et al., "Stress Relaxation of Ion Exchanged Float Aluminosilicate Glass at Different Temperature", Advanced Materials Research, vol. 650, pp. 216-219 (2013).
English Translation of Russian 1st Office Action & Search Report dated Jun. 28, 2019, for RU Patent Application No. 2017125443. pp. 1-13.
Non-Final Office Action dated Jul. 23, 2019, for U.S. Appl. No. 15/541,240, filed Jun. 30, 2017. pp. 1-15.
"Densities of Miscellaneous Solids". The Engineering ToolBox, Dec. 15, 2014 [online] [retrieved Jul. 17, 2019]. Retrieved from: URL: https://web.archive.org/web/20141215051319/www.engineeringtoolbox.com/density-solids-d_1265.html>. (Year: 2014). pp. 1-2.
Chinese 1st Office Action & Search Report dated Jul. 24, 2019, for CN 201580071668.8. pp. 1-12.
Chinese 1st Office Action & Search Report dated Jul. 26, 2019, for CN 201580071679.6. pp. 1-12.
Canadian 1st Office Action dated Sep. 26, 2019, for CA Patent Application No. 2,972,777. pp. 1-3.
Indian 1st Examination Report dated Oct. 4, 2019, for IN Patent Application No. 201717022433. pp. 1-5.
Korean 1st Office Action dated Jan. 10, 2020, for KR Patent Application No. 2017-7021362. pp. 1-6.
Japanese 1st Office Action dated Nov. 27, 2019, for JP Patent Application No. 2017-534228. pp. 1-9.
Japanese 1st Office Action dated Dec. 4, 2019, for JP Patent Application No. 2017-534227. pp. 1-10.

* cited by examiner

METHODS FOR TREATING GLASS ARTICLES

CROSS REFERENCE TO RELATED APPLICATIONS

The present specification claim priority to U.S. Provisional Patent Application Ser. No. 62/098,706 filed Dec. 31, 2014 and entitled "Methods for Treating Glass Articles," the entirety of which is incorporated by reference herein.

BACKGROUND

Field

The present specification generally relates to methods of treating glass articles and, more specifically, to methods of treating glass articles to improve the surface hydrolytic resistance of the glass articles.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard E438.92 'Type IA' and 'Type IB' glass compositions which have a proven history of chemical durability. In general terms, chemically durable glasses are glasses whose constituent components do not readily dissolve from the glass when the glass is exposed to a solution for extended periods of time.

Although glass compositions used in pharmaceutical packaging exhibit good chemical durability in bulk form, processing these glass compositions into the desired packaging form may introduce artifacts which degrade the chemical durability of the resultant package, such as the hydrolytic resistance of the glass package. This decrease in the hydrolytic resistance may impact the efficacy of the contents of the glass package over time, thereby reducing shelf life.

Accordingly, a need exists for alternative methods for treating glass articles to improve the hydrolytic resistance of the glass articles.

SUMMARY

According to one embodiment, a method of increasing the hydrolytic resistance of a glass article may include providing a glass article with a pre-treatment hydrolytic titration value. Thereafter, the glass article may be thermally treated at a treatment temperature greater than a temperature 200° C. less than a strain temperature of the glass article for a treatment time greater than or equal to about 0.25 hours such that, after thermally treating the glass article, the glass article has a post-treatment hydrolytic titration value that is less than the pre-treatment hydrolytic titration value.

In another embodiment, a method of increasing the hydrolytic resistance of a glass article may include providing a glass article with at least one surface having a glass surface layer with a composition that is different than a composition at a midpoint of a thickness of the glass article, the at least one surface having a pre-treatment hydrolytic titration value. Thereafter, species from the glass surface layer may be diffused into the thickness of the glass article to homogenize the surface glass layer relative to the midpoint of the thickness of the glass article such that, after diffusing, the at least one surface of the glass article has a post-treatment hydrolytic titration value which is less than the pre-treatment hydrolytic titration value.

Additional features and advantages of the methods of treating glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
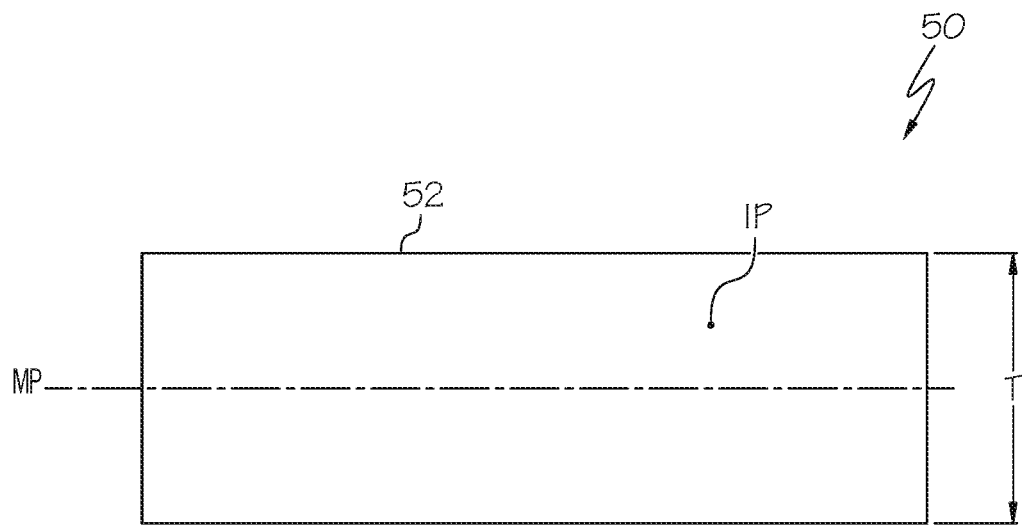
FIG. 1A schematically depicts an axial cross section of a glass tube prior to conversion into a glass container.

Reference will now be made in detail to various embodiments of methods of treating glass articles to increase the hydrolytic resistance of the glass articles. Whenever possible, the same reference numerals will be used throughout the drawings to refer to the same or like parts. In one embodiment, a method of increasing the hydrolytic resistance of a glass article may include providing a glass article with a pre-treatment hydrolytic titration value. Thereafter, the glass article may be thermally treated at a treatment temperature greater than a temperature 200° C. less than a strain temperature of the glass article for a treatment time greater than or equal to about 0.25 hours such that, after thermally treating the glass article, the glass article has a post-treatment hydrolytic titration value that is less than the pre-treatment hydrolytic titration value. The methods of treating glass articles to increase hydrolytic resistance and the properties of the glass articles treated by the methods will be described in more detail herein with specific reference to the appended drawings.

The phrase "strain temperature" or "strain point," as used herein, refers to the temperature at which a glass has a viscosity of $1 \times 10^{14.5}$ poise.

The phrase "anneal temperature" or "annealing temperature," as used herein, refers to the temperature at which a glass has a viscosity of $1 \times 10^{13.4}$ poise.

The phrase "softening point," as used herein, refers to the temperature at which a glass has a viscosity of $1 \times 10^{7.6}$ poise.

The term "chemical durability," as used herein, refers to the ability of a glass composition to resist degradation upon exposure to specified chemical conditions. The chemical durability of a glass composition can be assessed according to various established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." The chemical durability of a glass composition in container form may also be assessed according to USP <660> entitled "Surface Glass Test," and/or European Pharmacopeia 3.2.1 entitled "Glass Containers For Pharmaceutical Use" which assess the chemical durability of the surface of the glass, specifically the surface hydrolytic resistance (SHR) of the surfaces of the glass.

The phrase "hydrolytic titration value," as used herein, refers to the volume (mL) of 0.1 M hydrochloric acid per 100 mL of test liquid required to titrate the test liquid to a neutral pH. The hydrolytic titration value is determined according to the "Surface Glass Test" described in USP <660> "Containers—Glass." For purposes of this description, the hydrolytic titration value may be expressed as a pre-treatment hydrolytic titration value or a post-treatment hydrolytic titration value. The pre-treatment hydrolytic titration value is a characterization of the surface hydrolytic resistance of the surface of the glass article in its as-formed condition (i.e., after formation of the glass article but prior to any modification of the surfaces of the glass article including, without limitation, exposure to the treatment methods described herein and/or the application of any coating materials to the surfaces of the glass article). The post-treatment hydrolytic titration value is a characterization of the surface hydrolytic resistance of the surfaces of the glass article after exposure to the treatment methods described herein but prior to any other modifications to the surfaces of the glass article subsequent to formation, including the application of any coating materials (if any) to the surfaces of the glass article. Higher values of the hydrolytic titration value indicate lower surface hydrolytic resistance while lower values of the hydrolytic titration value indicate greater surface hydrolytic resistance.

Glass articles, such as glass containers or glass packages for containing pharmaceutical compositions, may be formed from glass compositions which are known to exhibit low thermal expansion and good chemical durability, at least in bulk form. Non-limiting examples of glass compositions commonly used for such applications include glass compositions classified as Type IB alkali borosilicate glasses. Other glass compositions suitable for such applications include those glass compositions classified as Type I, Type II and/or Type III glass according to the United States Pharmacoepial Convention (USP) which may include alkali aluminosilicate glass compositions, soda lime glass compositions and the like. While these glasses generally exhibit good chemical durability in bulk form, manufacturers of glass articles, such as containers, have routinely observed inorganic deposits on the interior surface of the glass container, particularly when tube conversion processes are used to form the glass container. These inorganic deposits vary in both composition and morphology from the glass composition that the container is formed from. In some cases, the inorganic deposits may also have lower chemical durability, including a lower surface hydrolytic resistance, relative to the bulk glass compositions and, as such, generally degrade the performance of the container.

Without being bound by any particular theory as to the origin of these deposits, it is believed that these inorganic deposits are bi-products of the forming process. That is, the high silica content of these glass compositions contribute to the overall chemical durability of the glass but also cause the glass compositions to have relatively high melting and forming temperatures. Alkali and/or borate components (and similar components) are included in the glass compositions in specific quantities to enhance chemical durability of the glass. However, these components melt and/or volatilize at much lower temperatures than silica. For example, sodium and borate species in the glass are highly volatile and evaporate from the surface of the glass at the high temperatures necessary to form and reform the glass into a desired shape.

Specifically, glass stock, such as a glass tube or the like, is reformed into glass containers at high temperatures and in direct flames. The high temperatures cause the more volatile species in the glass, such as borate and/or alkali species, to evaporate from portions of the surface of the glass. The volatilized species may be re-deposited on other areas of the glass container surface as inorganic deposits, either as a continuous deposit or layer, or as discrete deposits over the surface of the glass. These deposits create compositional heterogeneities in the glass container surface, particularly with respect to the near-surface regions of the interior of the glass container (i.e., those regions at or directly adjacent to the interior surfaces of the glass container).

Figure 1B:
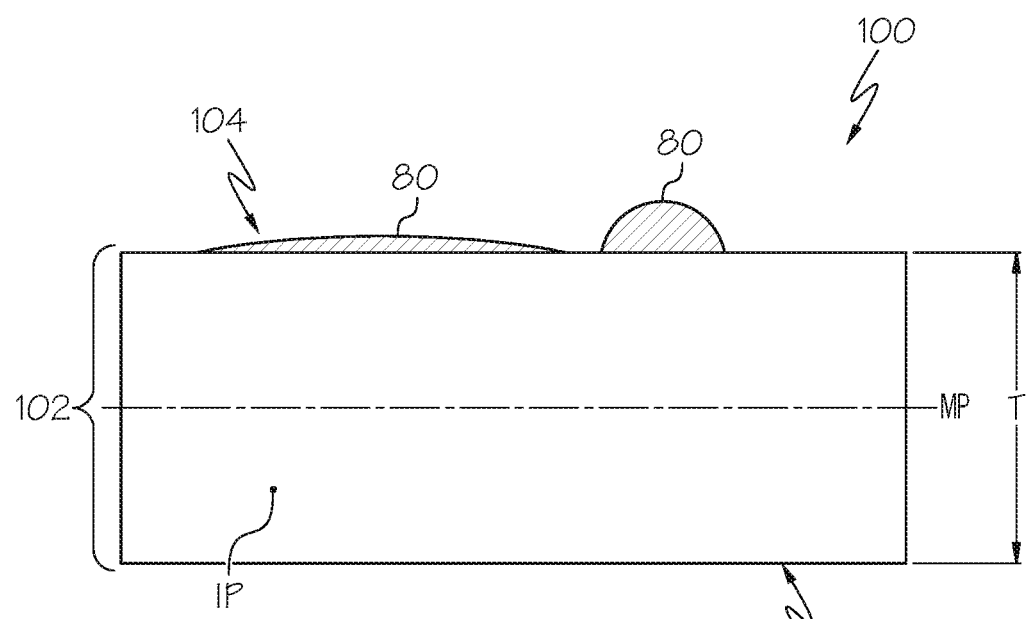
FIG. 1B schematically depicts inorganic deposits on the inner surface of a glass container in as-formed condition.

Referring to FIGS. 1A and 1B by way of example, FIG. 1A schematically depicts a portion of a sidewall of a glass tube 50, including the inner surface 52 of the glass tube 50, prior to conversion of the glass tube 50 to a shaped glass article, such as a glass container or the like. Prior to conversion of the glass tube 50 to a shaped glass article, the glass tube 50 has a relatively uniform, homogenous composition through the thickness T of the sidewall. That is, the composition of the inner surface 52 of the glass tube 50 is substantially the same as the glass composition below the surface and in the thickness of the sidewall of the glass tube 50, such as at an intermediate-point IP in the thickness T and/or at the mid-point MP. Similarly, the composition over the inner surface 52 of the glass tube is also relatively uniform and homogenous laterally (i.e., across the inner surface of the glass tube). The composition of the inner surface, as used herein, refers to the composition of the glass at a depth from about 10 nm to about 20 nm from the inner surface 52.

However, during the process of converting the glass tube 50 to a shaped glass article, inorganic deposits form on at least the inner surface of the sidewall and alter the composition of at least the inner surface of the resultant shaped glass article relative to the bulk composition of the glass in the thickness.

Specifically, FIG. 1B schematically depicts a portion of a body 102 of a glass container 100. The body 102 has a thickness T which extends from an interior surface 104 to an exterior surface 106. Inorganic deposits 80 on the interior surface 104 form a glass surface layer integral with the body 102. These inorganic deposits 80 have a composition which varies from the composition of the glass body 102 in the thickness T, such as the composition of the glass at an intermediate point IP in the thickness T and/or at the midpoint MP. That is, the composition of the glass body 102 exhibits compositional heterogeneities through the thickness T of the glass body 102 and may also exhibit compositional heterogeneities over the interior surface 104 of the glass body 102. The exact composition of the inorganic deposits 80 is dependent upon the composition of the glass from which the body 102 is formed. For example, in embodiments where the glass body 102 is formed from an alkali borosilicate glass, the inorganic deposits 80 may be rich in boron and/or alkali constituents. Alternatively, in embodiments where the glass body 102 is formed from an alkali aluminosilicate glass, the inorganic deposits 80 may be rich in alkali constituents.

Figure 2:
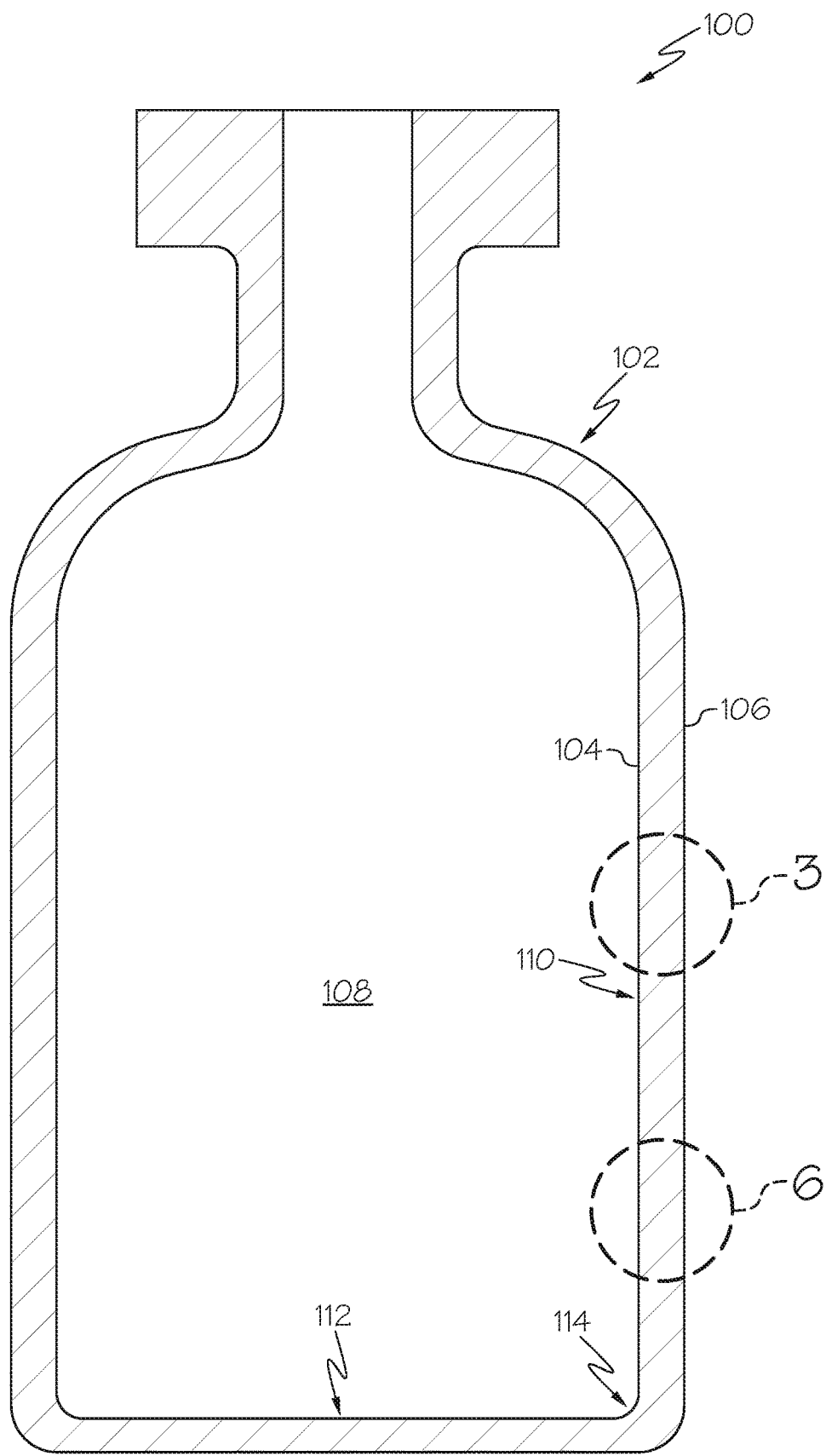
FIG. 2 schematically depicts a cross section of a glass container.
Figure 3:
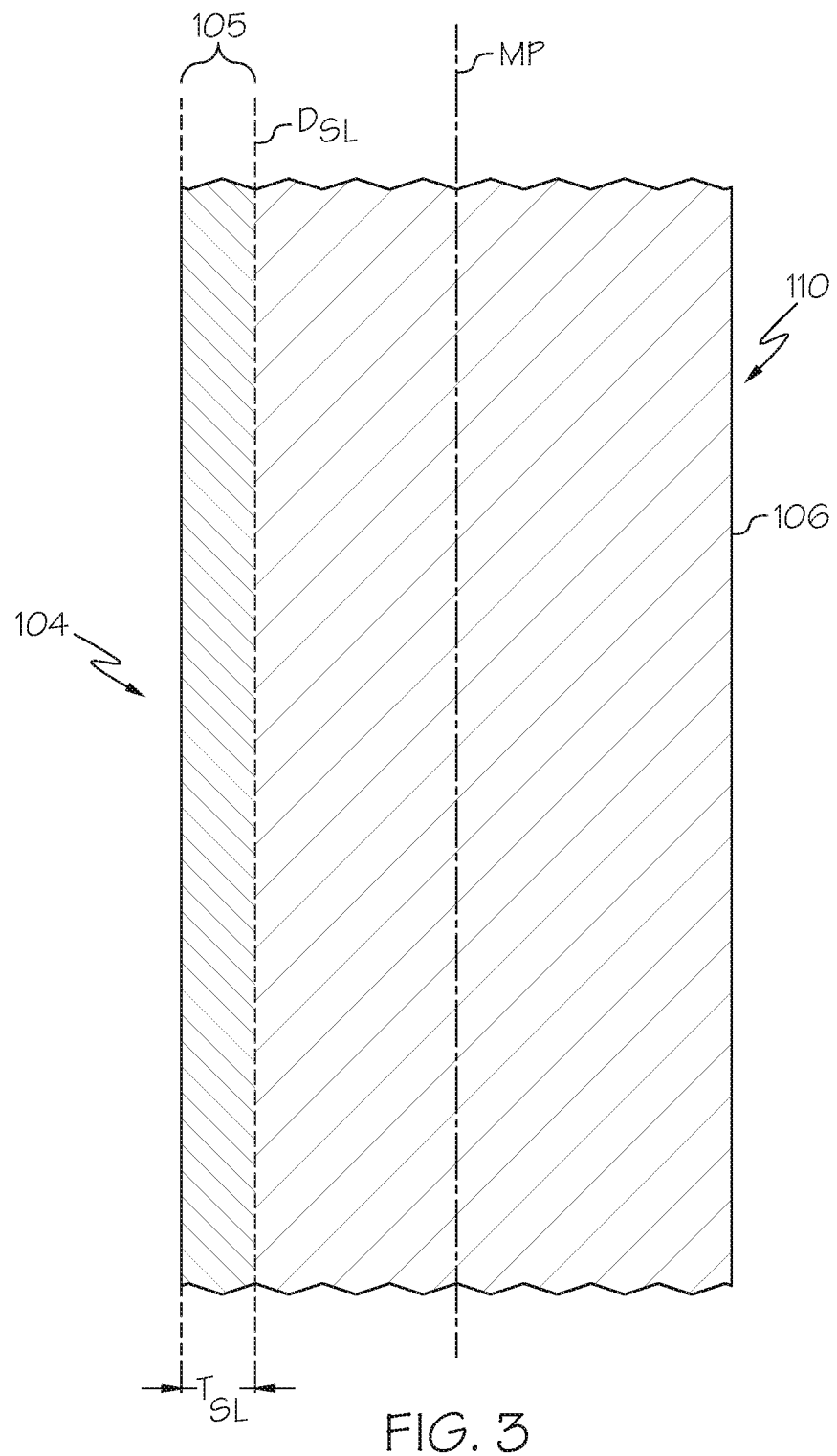
FIG. 3 schematically depicts a partial cross section of the wall portion and glass surface layer of the glass container of FIG. 2.

The variations in the compositional characteristics of a glass article due to the inorganic deposits 80 may be further understood with reference to FIGS. 2 and 3. Specifically, FIG. 2 schematically depicts a glass article, such as a glass container 100 for storing a pharmaceutical composition. The glass container 100 generally comprises a glass body 102. The glass body 102 extends between an interior surface 104 and an exterior surface 106 and generally encloses an interior volume 108. In the embodiment of the glass container 100 shown in FIG. 1, the glass body 102 generally comprises a wall portion 110 and a floor portion 112. The wall portion 110 and the floor portion 112 may generally have a thickness in a range from about 0.5 mm to about 3.0 mm. The wall portion 110 transitions into the floor portion 112 through a heel portion 114. The interior surface 104 and floor portion 112 are uncoated (i.e., they do not contain any inorganic coatings or organic coatings) and, as such, the contents stored in the interior volume 108 of the glass container 100 are in direct contact with the glass from which the glass container 100 is formed. While the glass container 100 is depicted in FIG. 2 as having a specific shape form (i.e., a vial), it should be understood that the glass container 100 may have other shape forms, including, without limitation, vacutainers, cartridges, syringes, syringe barrels, ampoules, bottles, flasks, phials, tubes, beakers, or the like.

As noted herein, the glass container 100 may be formed by converting a glass tube into the container shape. For example, as one end of a glass tube is heated to close the glass tube and form the bottom or floor portion 112 of the glass container 100, more highly volatile species, such as borate species and/or alkali species or the like, may evaporate from the bottom portion of the tube and be re-deposited elsewhere in the tube, forming the inorganic deposits described above. The evaporation of material from the heel and floor portions of the container is particularly pronounced as these areas of the container undergo the most extensive reformation and, as such, are exposed to the highest temperatures. As a result, the areas of the container exposed to higher temperatures, such as the floor portion 112, may have silica-rich surfaces. The inorganic deposits are formed by the condensation of the volatilized species on areas of the interior surface 104 amenable to deposition (i.e., those areas at a lower temperature), such as the wall portion 110, creating a glass surface layer integral with the wall portion 110 but which varies in composition from the remainder of the wall portion 110. For example, in the case of borate species, areas amenable to boron deposition which are at a temperature greater than the anneal temperature of the glass composition but less than the hottest temperature the glass is subjected to during reformation may be prone to boron incorporation on the surface of the glass, resulting in the inorganic deposits of the glass surface layer.

Referring now to FIGS. 2 and 3, FIG. 3 schematically depicts the interior surface 104 of a portion of a glass container 100, including the glass surface layer 105 which includes the inorganic deposits. The composition of the glass surface layer 105 is different than the composition of the glass further into the thickness of the wall portion 110, such as at the midpoint MP of the wall portion 110. Specifically, FIG. 3 schematically depicts a partial cross section of a wall portion 110 of the glass container 100 of FIG. 1. The glass body 102 of the glass container 100 includes a glass surface layer 105 which extends from the interior surface 104 of the glass container 100 into the thickness of the wall portion 110 to a depth $D_{SL}$ from the interior surface 104 of the glass container. The glass composition within the glass surface layer 105 has a persistent layer heterogeneity relative to the glass at the midpoint MP of the wall portion and, as such, it should be understood that the composition of the glass in the glass surface layer 105 is different than the glass at the midpoint MP of the wall portion 110. In some embodiments, the thickness $T_{SL}$ of the glass surface layer is at least about 1 nm. In some embodiments, the thickness $T_{SL}$ of the glass surface layer is at least about 5 nm. In some embodiments, the thickness $T_{SL}$ of the glass surface layer is at least about 10 nm. In some embodiments, the thickness $T_{SL}$ of the glass surface layer is at least about 15 nm. In some other embodiments, the thickness $T_{SL}$ of the glass surface layer is at least about 20 nm or even about 25 nm. In some embodiments, the thickness $T_{SL}$ of the glass surface layer is at least about 30 nm. In some embodiments, the thickness $T_{SL}$ of the glass surface layer is at least about 50 nm. In some embodiments, the thickness $T_{SL}$ of the glass surface layer is at least about 100 nm. In some embodiments, the thickness $T_{SL}$ of the glass surface layer is at least about 150 nm.

In the embodiments described herein, the phrase "persistent layer heterogeneity" means that the concentration of the constituent components (e.g., $SiO_2$, $Al_2O_3$, $Na_2O$, etc.) of the glass composition in the glass surface layer 105 vary from the concentration of the same constituent components at the midpoint of a thickness of the glass body (i.e., at a point along the midpoint line MP which evenly bisects the glass body between the interior surface 104 and the exterior surface 106) by an amount which degrades the surface hydrolytic resistance of the interior surface 104 of the glass container 100. In the embodiments described herein, the persistent layer heterogeneity in the glass surface layer of the glass body is such that an extrema (i.e., the minimum or maximum) of a layer concentration of each of the constituent components of the glass composition in the glass surface layer 105 is less than about 92% or greater than about 108% of the same constituent component at a midpoint of a thickness of the glass body when the glass container 100 is in as-formed condition. In other embodiments, the persistent layer heterogeneity in the glass surface layer 105 of the glass body is such that the extrema of the layer concentration of each of the constituent components of the glass composition in the glass surface layer 105 is less than about 90% or greater than about 110% of the same constituent component at the midpoint of the thickness of the glass body when the glass container 100 is in as-formed condition. In still other embodiments, the persistent layer heterogeneity in the glass surface layer 105 of the glass body is such that the extrema of the layer concentration of each of the constituent components of the glass composition in the glass surface layer 105 is less than about 80% or greater than about 120% of the same constituent component at the midpoint of the thickness of the glass body when the glass container 100 is in as-formed condition. In some embodiments, the persistent layer heterogeneity is exclusive of constituent components of the glass composition which are present in an amount less than about 2 mol. %. The persistent layer heterogeneity is also exclusive of any water which may be present in the glass composition.

The term "as-formed condition," as used herein, refers to the composition of the glass container 100 after the glass container has been formed from glass stock but prior to the container being exposed to any additional processing steps, such as annealing, heat treatment, ion-exchange strengthening, coating, ammonium sulfate treatment, acid etching, and/or any other surface modifications. In the embodiments described herein, the layer concentrations of the constituent components in the glass composition are determined by collecting a composition sample through the thickness of the glass body in the area of interest using dynamic secondary ion mass spectroscopy ("D-SIMS"). In the embodiments described herein, the composition profile is sampled from areas of the interior surface 104 of the glass body 102. The sampled areas have a maximum area of 1 mm². This technique yields a compositional profile of the species in the glass as a function of depth from the interior surface of the glass body for the sampled area.

When the glass container is formed from a glass composition which contains species prone to volatilization at elevated temperatures, such as boron species, the presence of the glass surface layer 105 containing inorganic deposits that include the boron species may be ascertained qualitatively. Specifically, the glass container 100 may be filled with a solution of methylene blue dye. The methylene blue dye reacts with and chemically bonds to the boron-rich regions of the glass surface, visibly staining the areas blue. A suitable methylene blue dye solution may include, without limitation, a 1% solution of methylene blue in water.

The inorganic deposits of the glass surface layer 105 may have a higher solubility in aqueous solutions than the bulk of the glass composition and, as such, decrease the surface hydrolytic resistance of the glass body 102. The surface hydrolytic resistance is assessed according to the Surface Glass Test of USP <660> utilizing the hydrolytic titration values described above for relative comparison. A glass container 100 having a glass surface layer containing inorganic deposits 80 on an interior surface may have a lower surface hydrolytic resistance (i.e., a higher hydrolytic titration value) than a glass container without the inorganic deposits 80.

The reduction in surface hydrolytic resistance may lead to an interaction between the glass and material contained within the glass container and/or contacting a glass article. For example, solutions contained in the container may leach the material from the inorganic deposits of the glass surface layer 105, altering the composition of the solution and potentially degrading the solution and/or compromising the integrity of the solution.

One conventional solution to mitigate the degradation of surface hydrolytic performance is to coat the interior surface of the body of the glass container with an inorganic coating, such as $SiO_2$. This coating may have a thickness from about 100 nm to 200 nm and prevents the contents of the container from contacting the interior surface of the body prevents glass constituents from the glass surface layer from being dissolved in the solution. However, the application of such coatings may be difficult and require additional manufacturing and/or inspection steps, thereby increasing the overall cost of container manufacture. Further, if the contents of the container penetrate the coating and contact the interior surface of the body, such as through a discontinuity in the coating, the resultant interaction between the contents of the glass container and the glass may cause portions of the coating to detach from the interior surface of the body as the interior surface degrades by dissolution.

In the embodiments described herein, the surface hydrolytic resistance of glass containers is improved by thermally treating the glass containers at a temperature sufficient to promote the diffusion of chemical species in the glass, which temperature is generally above the annealing temperature of the glass. Heat treating above this temperature causes the inorganic deposits to react and diffuse into the bulk of the glass composition thereby improving the homogeneity of the glass surface layer relative to the midpoint of the wall portion of the glass container and also improving the surface hydrolytic resistance (i.e., decreasing the hydrolytic titration value).

Figure 4:
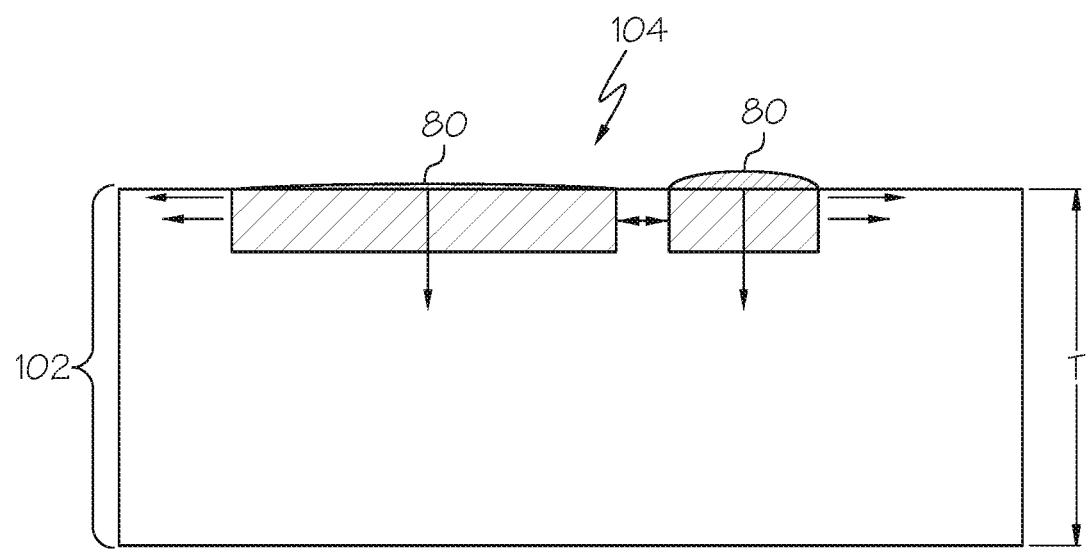
FIG. 4 schematically depicts the diffusion of inorganic deposits into the thickness of a glass container from the interior surface.

Referring now to FIG. 4, thermal treatment of the glass containers may be carried out by heating the glass containers in a kiln or lehr to a treatment temperature at which diffusion or reaction of the inorganic deposits can occur. The glass containers are held at the treatment temperature for a treatment time sufficient to diffuse the constituents of the inorganic deposits 80 (e.g., the boron and/or alkali species) both laterally and into the thickness T of the glass body 102, as schematically depicted in FIG. 4, thereby decreasing the local concentration and the concentration gradient of these constituents at the interior surface 104 and producing a more homogenous composition profile (i.e., a composition profile with a lower slope) through the thickness T of the glass body 102.

In the embodiments described herein, the treatment temperature of the thermal treatment is greater than a temperature that is 200° C. below the strain point of the glass (i.e., greater than strain temperature (° C.) −200° C.). In some embodiments, the treatment temperature may be greater than or equal to the annealing temperature of the glass or even greater than or equal to about 50° C. above the annealing temperature of the glass. In some other embodiments, the treatment temperature may be greater than or equal to about 100° C. above the annealing temperature of the glass or even greater than or equal to about 150° C. above the annealing temperature of the glass. In still other embodiments, the treatment temperature may be greater than or equal to about 200° C. above the annealing temperature of the glass or even greater than or equal to about 250° C. above the annealing temperature of the glass. In all embodiments, the treatment temperature is less than or equal to the softening point of the glass in order to preserve the structural integrity and shape characteristics of the glass container. In embodiments, the treatment temperature of the thermal treatment is greater than a temperature that is 200° C. below the strain point of the glass (i.e., greater than strain temperature (° C.) −200° C.) and less than the annealing temperature of the glass.

In the embodiments described herein, the treatment time is of a sufficient duration to reduce any compositional gradients that exist thereby yielding a more homogenous surface. For treatment temperatures at or above the anneal point, the treatment time may be greater than or equal to 0.25 hours or even greater than 0.5 hours. In some embodiments, the treatment time may be greater than or equal to 1 hour or even greater than or equal to 2 hours. In some other embodiments, the treatment time may be greater than or equal to 3 hours or even greater than or equal to about 4 hours. In these embodiments, the treatment times may be less than or equal to 12 hours, or even less than or equal to 8 hours.

It should be understood that the diffusion of the species forming the inorganic deposits is temperature dependent and, as such, proceeds according to the Arrhenius equation. Accordingly, lower treatment temperatures will require greater treatment times to reach the same degree of diffusion achieved at relatively higher treatment temperatures and relatively lower treatment times.

The reincorporation of the inorganic deposits by diffusion is also dependent on several factors including: the concentration of species in the inorganic deposits; the relative size and charge of the species in the inorganic deposits; the diffusion rate of the species in the bulk glass composition; and the reaction rate between the inorganic deposit and the bulk glass composition.

Figure 5A:
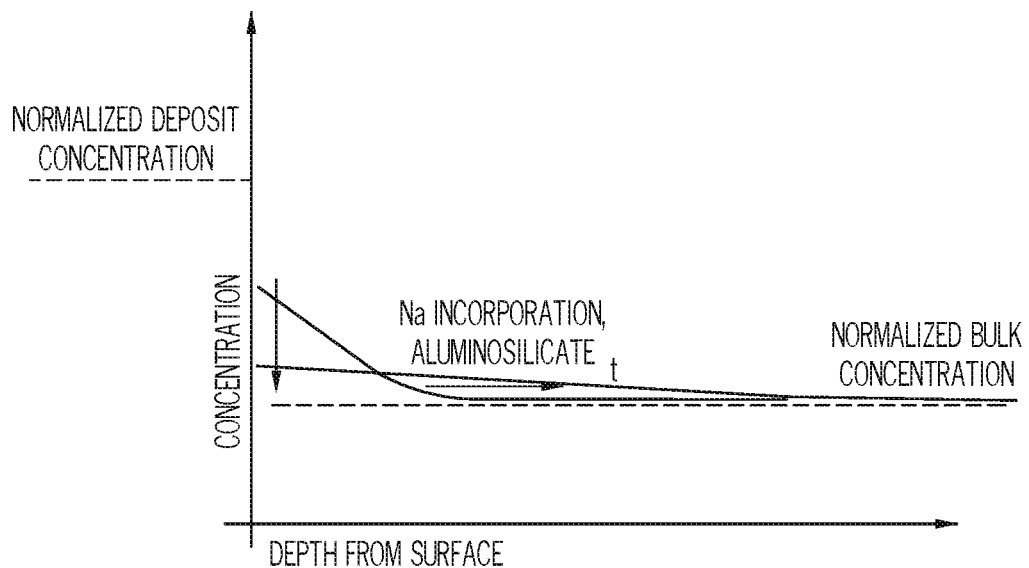
FIG. 5A graphically depicts the diffusion of alkali species from the surface of a glass over time as a function of depth from the surface.

For example, FIG. 5A graphically depicts the temporal evolution of the diffusion of alkali species from the surface of the glass and into the thickness of the glass for an alkali aluminosilicate glass. As noted above, the inorganic deposits in alkali aluminosilicates generally include alkali species (e.g., sodium and potassium) which have a +1 valence. The relatively low valence correlates to high diffusion rates for these species in the glass. The concentration of these species in the inorganic deposits is generally lower than the concentration of, for example, boron species in the inorganic deposits formed from borosilicate glasses. In addition, the reaction rate between the alkali species and the glass favors the reincorporation of the alkali species back into the bulk glass composition. As shown in FIG. 5A, for a given treatment temperature, the alkali species readily diffuse into the bulk glass with increasing time, resulting in a smooth composition profile as a function of depth and modifying the composition of the glass surface layer such that the composition of the glass surface layer is similar to the composition within the bulk of the glass.

Figure 5B:
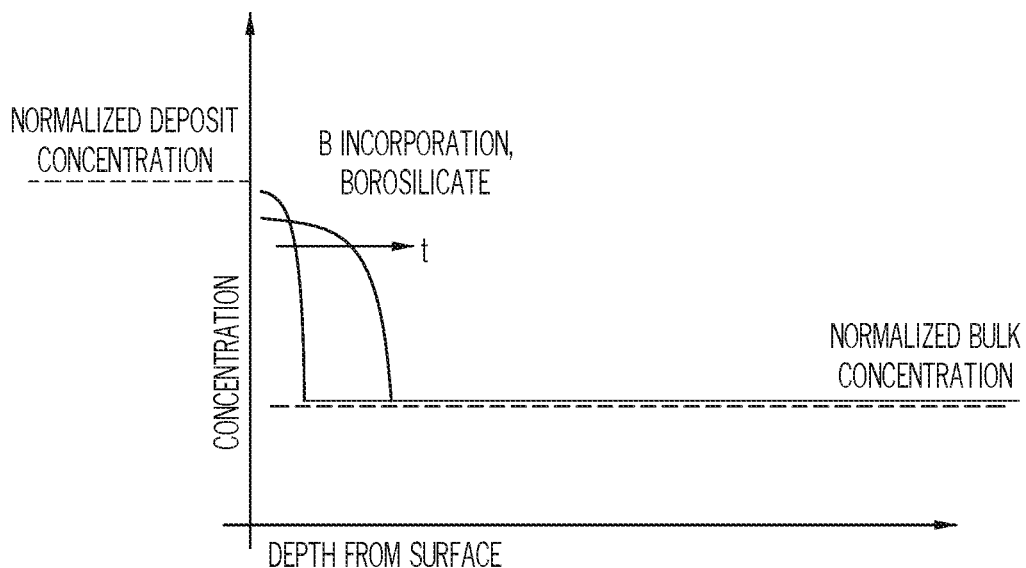
FIG. 5B graphically depicts the diffusion of boron species from the surface of a glass over time as a function of depth from the surface.

In contrast, FIG. 5B graphically depicts the temporal evolution of the diffusion of boron species from the surface of the glass and into the thickness of the glass for a borosilicate glass. As noted above, the inorganic deposits in borosilicates generally include boron and alkali species (e.g., sodium). The boron species have a +3 valence correlating to lower diffusion rates in glass relative to the alkali species that have a +1 valence. The concentration of the boron species in the inorganic deposits is generally greater than the concentration of alkali species in the inorganic deposits formed in alkali aluminosilicate glasses. For a given treatment temperature, this combination of factors causes the reincorporation of the boron species to proceed along a reaction front into the thickness of the glass, as depicted in FIG. 5B, producing a different composition profile than in the alkali aluminosilicate glass depicted in FIG. 5A.

While the concentration profiles in FIGS. 5A and 5B are different after thermal treatment, the end results are similar in that the species forming the inorganic deposits are diffused or reacted into the bulk glass and away from the surface, reducing the propensity of these species to dissolution when the surface of the glass comes into contact with a solution.

Based on the foregoing it should be understood that the thermal treatments described herein improve the surface hydrolytic resistance of the glass by diffusing the species forming the inorganic deposits into the bulk of the glass and away from the surface. The improvement in the surface hydrolytic resistance may be characterized by determining the pre-treatment hydrolytic titration value for a first set of glass containers and comparing this value to the post-treatment hydrolytic titration value for a second set of glass containers formed from the same glass composition after the second set of glass containers are treated according to the methods described herein. In the embodiments described herein, the post-treatment hydrolytic titration value is less than the pre-treatment hydrolytic titration value indicating that the species forming the inorganic deposits have been diffused into the bulk glass and away from the interior surface, making the species less susceptible to dissolution when the surface of the glass comes into contact with a solution. In the embodiments described herein, the glass containers meet the criteria for Type I glass under the surface treatment test of USP <660> after thermal treatment.

Specifically, to assess the improvement in the surface hydrolytic resistance, a set of identical glass containers in the as-formed condition and having the same glass composition are randomly divided into a first subset and a second subset, each with an equal number of glass container members. The number of containers in each of the first subset and the second subset are sufficient to produce at least one surface hydrolytic measurement according to the surface treatment test of USP <660>. For example, a 3 mL vial holds approximately 4.9 mL of liquid, so at least 11 vials are required to produce 50 mL of test fluid and at least 22 to produce 100 mL of test fluid. The pre-treatment hydrolytic titration value of the first subset of glass containers is determined by determining the hydrolytic titration value for each glass container in the subset according to the Surface Glass Test of USP <660>, as described above. The pre-treatment hydrolytic titration value for the first subset is the average hydrolytic value of all glass containers in the first subset because the individual solutions are pooled for a single measurement according to USP <660>. The second subset of glass containers is exposed to a thermal treatment as described herein. Thereafter, the post-treatment hydrolytic titration value of the second subset of glass containers is determined by determining the hydrolytic titration value for each glass container in the subset according to the Surface Glass Test of USP <660>. The post-treatment hydrolytic titration value for the second subset is the average hydrolytic value of all glass containers in the second subset because the individual solutions are pooled for a single measurement according to USP <660>. As noted above, the post-treatment hydrolytic titration value is less than the pre-treatment hydrolytic titration value in the embodiments described herein, indicating that the glass containers have improved surface hydrolytic performance after heat treatment.

Referring again to FIGS. 2 and 3, in embodiments where the glass container is substantially free of boron (e.g., when the glass container is formed from alkali aluminosilicate glass), the glass container has a more homogenous composition through the thickness of the glass body 102 in each of the wall, heel, and floor portions relative to the midpoint MP after the glass container 100 is thermally treated. That is, the composition of the glass surface layer 105 as modified during the thermal treatment is more similar to the composition of the glass further into the thickness of the wall portion 110, such as at the midpoint MP of the wall portion 110, than before the thermal treatment. The decrease in the compositional variation is referred to as a persistent layer homogeneity relative to the glass at the midpoint MP of the wall portion 110.

In the embodiments described herein, the phrase "persistent layer homogeneity" means that the concentration of the constituent components (e.g., $SiO_2$, $Al_2O_3$, $Na_2O$, etc.) of the glass composition in the glass surface layer 105 do not vary from the concentration of the same constituent components at the midpoint of a thickness of the glass body (i.e., at a point along the midpoint line MP which evenly bisects the glass body between the modified interior surface 104" and the exterior surface 106) by an amount which would degrade the surface hydrolytic performance of the glass container. In the embodiments described herein, the persistent layer homogeneity in the glass surface layer 105 of the glass body 102 is such that an extrema (i.e., the minimum or maximum) of a layer concentration of each of the constituent components of the glass composition in the glass surface layer 105 is greater than or equal to about 80% and less than or equal to about 120% of the same constituent component at a midpoint of a thickness of the glass body after the glass container has been thermally treated. In other embodiments, the persistent layer homogeneity in the glass surface layer of the glass body is such that the extrema of the layer concentration of each of the constituent components of the glass composition in the glass surface layer is greater than or equal to about 90% and less than or equal to about 110% of the same constituent component at the midpoint of the thickness of the glass body after the glass container has been thermally treated. In still other embodiments, the persistent layer homogeneity in the glass surface layer of the glass body is such that the extrema of the layer concentration of each of the constituent components of the glass composition in the glass surface layer is greater than or equal to about 92% and less than or equal to about 108% of the same constituent component at the midpoint of the thickness of the glass body after the glass container has been thermally treated. In some embodiments, the persistent layer homogeneity is exclusive of constituent components of the glass composition which are present in an amount less than about 2 mol. %. The persistent layer homogeneity is also exclusive of any water which may be present in the glass composition.

Modifying the glass surface layer with the persistent layer heterogeneity such that the glass surface layer of the glass container has a persistent layer homogeneity, as described above, generally improves the surface hydrolytic resistance performance of the glass container. Specifically, providing the glass container with a glass surface layer which is homogenous in composition (i.e., the extrema of the concentration of the constituent components in the glass surface layer is within +/− 20% of the same constituent components at the midpoint of the thickness of the glass body) reduces the localized concentration of constituent components of the inorganic deposits which may be susceptible to leaching which, in turn, improves the surface hydrolytic performance of the glass container.

After thermal treatment the glass container has a substantially unitary composition which extends from the interior surface of the body to a depth of at least 250 nm or even at least 300 nm. The term "unitary composition," as used herein, refers to the glass from which the portion of the glass body extending from the interior surface 104 into the thickness of the body to a depth of at least 250 nm or even at least than 300 nm is a single composition of material as compared to a coating material applied to another material of either the same or different composition. For example, in some embodiments, the body of the container may be constructed from a single glass composition. In other embodiments, the body of the container may be constructed from a laminated glass such that the interior surface of the body has a unitary composition which extends from the interior surface to a depth of at least 250 nm or even at least 300 nm. The glass container may include a glass surface layer which extends from the modified interior surface to a depth of at least 1 nm, as noted above. In the case of a laminated glass container, the glass surface layer on the interior surface may have a persistent layer homogeneity relative to the midpoint of the laminae that it is a part of.

Figure 6:
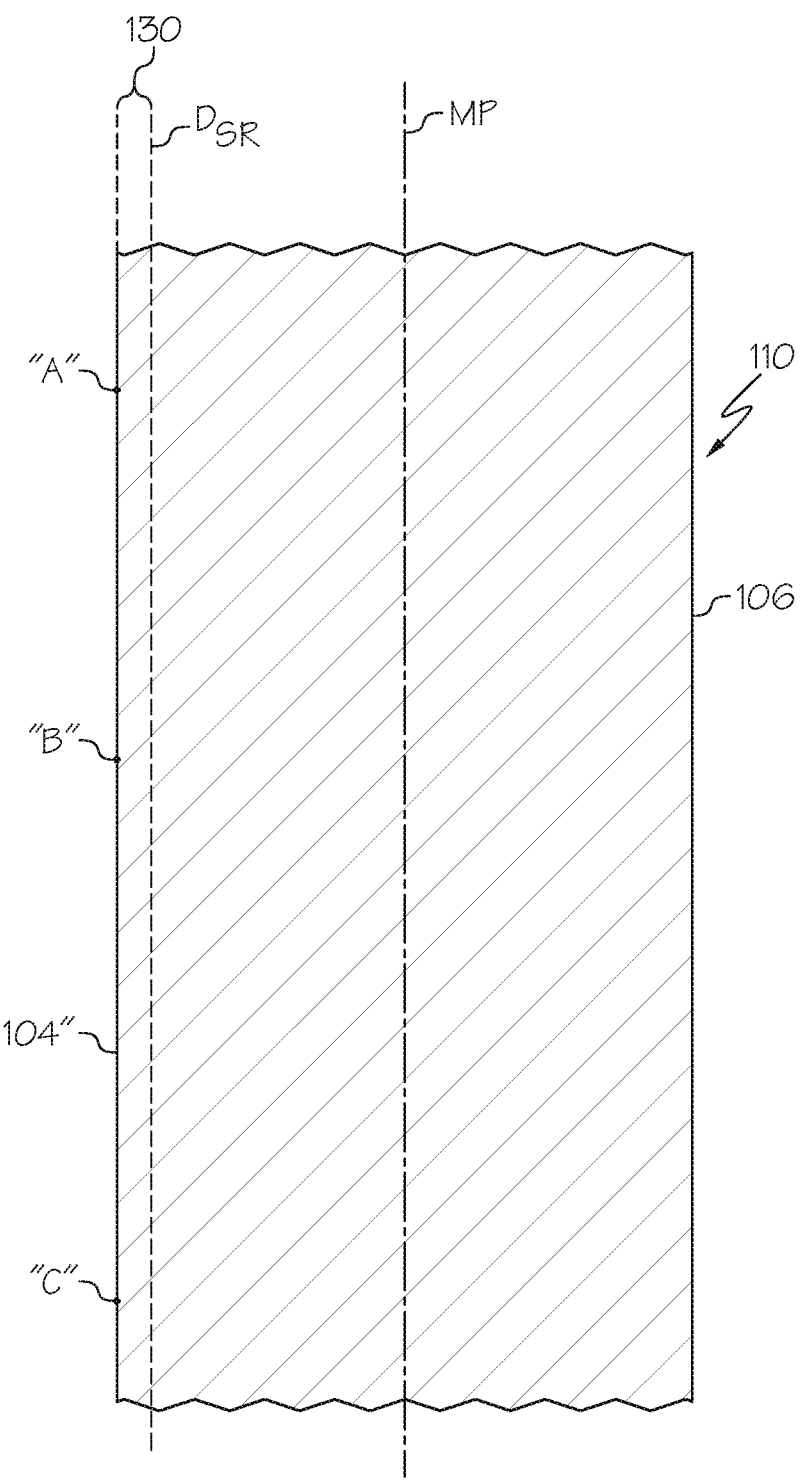
FIG. 6 schematically depicts a partial cross section of the wall portion and glass surface layer of the glass container of FIG. 2.

Referring now to FIGS. 2 and 6, the glass containers described herein may also have a homogenous surface composition over the interior surface 104, 104" of the glass body 102, including in the wall, heel, and floor portions, after exposure to the thermal treatment. FIG. 6 schematically depicts a partial cross section of a wall portion 110 of the glass container 100 after exposure to the thermal treatment. The glass container 100 has a surface region 130 which extends over the entire interior surface 104, 104" of the glass container. The surface region 130 has a depth $D_{SR}$ which extends from the interior surface 104, 104" of the glass container 100 into a thickness of the glass body towards the exterior surface 106. Accordingly, it should be understood that the surface region 130 has a thickness $T_{SR}$ which is equal to the depth $D_{SR}$. In some embodiments, the surface region extends to a depth $D_{SR}$ of at least about 10 nm from the interior surface 104, 104" of the glass container 100. In some other embodiments, the surface region 130 may extend to a depth $D_{SR}$ of at least about 50 nm. In some other embodiments, the surface region 130 may extend to a depth $D_{SR}$ from about 10 nm to about 50 nm. It should be understood that the surface region 130 extends to a shallower depth than the glass surface layer 105. The glass composition of the surface region has a persistent surface homogeneity after thermal treatment which improves the surface hydrolytic performance of the glass container.

In the embodiments described herein, the phrase "persistent surface homogeneity" means that the concentrations of the constituent components (e.g., $SiO_2$, $Al_2O_3$, $Na_2O$, etc.) of the glass composition at a discrete point in the surface region do not vary from the concentrations of the same constituent components at any second discrete point in the surface region by an amount which would degrade the surface hydrolytic resistance of the glass container after thermal treatment. In the embodiments described herein, the persistent surface homogeneity in the surface region is such that, for a discrete point on the interior surface 104 of the glass container, the extrema (i.e., the minimum or maximum) of the surface concentration of each of the constituent components in the surface region 130 at a discrete point is greater than or equal to about 70% and less than or equal to about 130% of the same constituent components in the surface region 130 at any second discrete point on the interior surface 104 of the glass container 100 after the glass container is thermally treated. For example, FIG. 6 depicts three discrete points (A, B, and C) on the interior surface 104 of the wall portion 110. Each point is separated from an adjacent point by at least about 3 mm. The extrema of the surface concentration of each of the constituent components in the surface region 130 at point "A" is greater than or equal to about 70% and less than or equal to about 130% of the same constituent components in the surface region 130 at points "B" and "C". When referring to the heel portion of the container, the discrete points may be approximately centered at the apex of the heel with adjacent points located at least 3 mm from the apex of the heel along the floor portion of the container and along the wall portion of the container, the distance between the points being limited by the radius of the vial and the height of the sidewall (i.e., the point where the sidewall transitions to the shoulder of the vial).

In some embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 75% and less than or equal to about 125% of the same constituent component in the surface region 130 at any second discrete point on the interior surface 104 of the glass container 100 after the glass container is thermally treated. In some other embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 80% and less than or equal to about 120% of the same constituent component in the surface region 130 at any second discrete point on the interior surface 104 of the glass container 100 after the glass container is thermally treated. In still other embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 85% and less than or equal to about 115% of the same constituent component in the surface region 130 at any second discrete point on the interior surface 104 of the glass container 100 after the glass container is thermally treated. In the embodiments described herein, the surface concentration of the constituent components of the glass composition in the surface region is measured by photoelectron spectroscopy. In some embodiments, the persistent surface homogeneity in the surface region is exclusive of constituent components of the glass composition which are present in an amount less than about 2 mol. %. The persistent surface homogeneity is also exclusive of any water which may be present in the glass composition.

The homogeneity of the surface concentration of the glass constituent components in the surface region 130 after the glass container is thermally treated is generally an indication of the propensity of the glass composition to hydrolytic degradation. When the glass composition has a persistent surface homogeneity in the surface region 130 (i.e., when the extrema of the surface concentration of the glass constituent components in the surface region 130 at a discrete point on the interior surface 104 are within +/−30% of the same constituent components in the surface region 130 at any second discrete point on the interior surface 104), the glass composition has improved resistance to hydrolytic degradation.

It should now be understood that the glass containers described herein have a persistent layer homogeneity and/or a persistent surface homogeneity after thermal treatment, each of which improves the resistance of the glass containers to chemical degradation. The persistent layer homogeneity and/or the persistent surface homogeneity are present not only in the sidewall portions of the glass containers, but also in the heel and floor portions of the glass container such that the surfaces of the glass container bounding the interior volume have improved surface hydrolytic resistance.

Glass containers having the characteristics described hereinabove (i.e., homogenous compositions over the interior surface and through the thickness as well as resistance to surface hydrolytic degradation) are obtained by thermally treating the glass containers, as described herein. Specifically, the containers are initially formed with a persistent layer heterogeneity extending from the interior surface of the glass container (i.e., the composition of the interior surface layer is different than the composition of the glass at the midpoint of the wall portion). The containers are initially formed by providing a glass stock material, such as glass tubing, glass sheet or the like, and shaping the glass stock material into a glass container using conventional shaping techniques such that at least the interior surface of the glass container has a glass surface layer with a persistent heterogeneity. Thereafter, the glass surface layer, which includes inorganic deposits, is modified by diffusing the species forming the inorganic deposits into the bulk of the glass by thermal treatment, as described herein, such that the glass container has a homogenous composition over the interior surface and through the thickness of the wall portion.

In the embodiments described herein, the glass containers may be formed from glass compositions which meet the criteria for Type I, Class A (Type IA) or Type I, Class B (Type IB) glasses under ASTM Standard E438-92 (2011) entitled "Standard Specification for Glasses in Laboratory Apparatus". Borosilicate glasses meet the Type I (A or B) criteria and are routinely used for pharmaceutical packaging. Examples of borosilicate glass include, without limitation, Corning® Pyrex® 7740, 7800, Wheaton 180, 200, and 400, Schott Duran®, Schott Fiolax®, KIMAX® N-51A, Geresheimer GX-51 Flint and others. The glass containers may also be formed from glass compositions which exhibit an HGA1 or HGA2 resistance under ISO 720; a S1 or S2 acid resistance under DIN 12116; and/or an A1 or A2 base resistance under ISO 695, each of which are described in further detail herein. Other glasses which may be used in conjunction with the methods described herein are the glasses described in U.S. Pat. Nos. 8,551,898 and 9,145,329.

In some embodiments described herein, the glass body 102 is strengthened, such as by ion-exchange strengthening or the like, after the glass container is thermally treated. In embodiments, the glass body 102 may have a compressive stress of greater than or equal to about 250 MPa, 300 MPa or even greater than or equal to about 350 MPa at the surface of the glass. In embodiments, the compressive stress may be greater than or equal to about 400 MPa at the surface of the glass or even greater than or equal to about 450 MPa at the surface of the glass. In some embodiments, the compressive stress may be greater than or equal to about 500 MPa at the surface of the glass or even greater than or equal to about 550 MPa at the surface of the glass. In still other embodiments, the compressive stress may be greater than or equal to about 650 MPa at the surface of the glass or even greater than or equal to about 750 MPa at the surface of the glass. The compressive stress in the glass body 102 generally extends to a depth of layer (DOL) of at least about 10 μm. In some embodiments, the glass body 102 may have a depth of layer greater than about 25 μm or even greater than about 50 μm. In some other embodiments, the depth of the layer may be up to about 75 μm or even about 100 μm. The ion-exchange strengthening may be performed in a molten salt bath maintained at temperatures from about 350° C. to about 600° C. To achieve the desired compressive stress, the glass container in as-formed condition may be immersed in the salt bath for less than about 30 hours or even less than about 20 hours. In embodiments, the container may be immersed for less than about 15 hours or even for less than about 12 hours. In other embodiments, the container may be immersed for less than about 10 hours. For example, in one embodiment the glass container is immersed in a 100% $KNO_3$ salt bath at about 450° C. for about 5 hours to about 8 hours in order to achieve the desired depth of layer and compressive stress while maintaining the chemical durability of the glass composition.

The glass compositions from which the glass containers are formed are chemically durable and resistant to degradation, as determined by the ISO 720 standard, after thermal treatment. The ISO 720 standard is a measure of the resistance of the glass to degradation in distilled water (i.e., the hydrolytic resistance of the glass). In brief, the ISO 720 standard protocol utilizes crushed grass grains which are placed in contact with 18 MΩ water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 720 standard is broken into individual types. Type HGA1 is indicative of up to 62 μg extracted equivalent of $Na_2O$ per gram of glass grains; Type HGA2 is indicative of more than 62 μg and up to 527 μg extracted equivalent of $Na_2O$ per gram of glass grains; and Type HGA3 is indicative of more than 527 μg and up to 930 μg extracted equivalent of $Na_2O$ per gram of glass grains. The glass containers described herein have an ISO 720 type HGA1 hydrolytic resistance after thermal treatment.

The glass compositions from which the glass containers are formed are also chemically durable and resistant to degradation, as determined by the ISO 719 standard, after thermal treatment. The ISO 719 standard is a measure of the resistance of the glass to degradation in distilled water (i.e., the hydrolytic resistance of the glass). In brief, the ISO 719 standard protocol utilizes crushed glass grains which are placed in contact with 18 MΩ water at a pressure of 2 atm and a temperature of 98° C. for 60 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 719 standard is broken into individual types. Type HGB1 is indicative of up to 31 μg extracted equivalent of $Na_2O$ per gram of glass grains; Type HGB2 is indicative of more than 31 μg and up to 62 μg extracted equivalent of $Na_2O$ per gram of glass grains; Type HGB3 is indicative of more than 62 μg and up to 264 μg extracted equivalent of $Na_2O$ per gram of glass grains; Type HGB4 is indicative of more than 264 μg and up to 620 μg extracted equivalent of $Na_2O$ per gram of glass grains; and Type HGB5 is indicative of more than 620 μg and up to 1085 μg extracted equivalent of $Na_2O$ per gram of glass grains. The glass containers described herein have an ISO 719 type HGB1 hydrolytic resistance after thermal treatment.

With respect to the USP <660> test and/or the European Pharmacopeia 3.2.1 test, the glass containers described herein have a Type 1 chemical durability after thermal treatment. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability (and surface hydrolytic resistance) of the interior surface of the glass containers.

The glass compositions from which the glass containers are formed are also chemically durable and resistant to degradation in acidic solutions, as determined by the DIN 12116 standard, after thermal treatment. In brief, the DIN 12116 standard utilizes a polished glass sample (plate, vial, container, etc.) of a known surface area which is weighed and then positioned in contact with a proportional amount of boiling 6 M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is broken into individual classes. Class S1 indicates weight losses of up to 0.7 $mg/dm^2$; Class S2 indicates weight losses from 0.7 $mg/dm^2$ up to 1.5 $mg/dm^2$; Class S3 indicates weight losses from 1.5 $mg/dm^2$ up to 15 $mg/dm^2$; and Class S4 indicates weight losses of more than 15 $mg/dm^2$. The glass containers described herein have a DIN 12116 Class S2 acid resistance or better after thermal treatment.

The glass compositions from which the glass containers are formed are also chemically durable and resistant to degradation in basic solutions, as determined by the ISO 695 standard, after thermal treatment. In brief, the ISO 695 standard utilizes a polished glass sample (plate, vial, container, etc.) which is weighed and then placed in a solution of boiling 1 M NaOH+0.5 M $Na_2CO_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is broken into individual classes. Class A1 indicates weight losses of up to 75 $mg/dm^2$; Class A2 indicates weight losses from 75 $mg/dm^2$ up to 175 $mg/dm^2$; and Class A3 indicates weight losses of more than 175 $mg/dm^2$. The glass containers described herein have an ISO 695 base resistance of Class A2 or better after thermal treatment.

It should be understood that, when referring to the above referenced classifications according to ISO 695, ISO 719, ISO 720 or DIN 12116, a glass composition or glass article which has a specified classification "or better" means that the performance of the glass composition is as good as or better than the specified classification. For example, a glass article which has an ISO 695 base resistance of "Class A2" or better may have an ISO 695 classification of either Class A2 or Class A1.

EXAMPLES

The embodiments of methods for treating glass containers to improve surface hydrolytic resistance described herein will be further clarified by the following examples.

Example 1

To assess the effect of time and temperature on the improvement in surface hydrolytic resistance of glass containers thermally treated above the annealing temperature of the glass, a first group of glass containers comprising five sets of identical glass containers were heat treated under varying conditions (i.e., time and temperature) and the post-treatment hydrolytic titration values were determined for each heat treatment condition. The glass containers were formed from Corning code 2345 alkali aluminosilicate glass and had a nominal volume of 3 mL and a fill capacity of approximately 4.9 mL. The vials were produced from glass tubes on turret-style converting equipment. The vials were used in as-formed condition without an initial annealing step. The thermal treatments were performed on new (unused and unfilled) glass containers in as-formed condition.

A second group of glass containers comprising five sets of identical glass containers were also heat treated under varying conditions (i.e., time and temperature) and the post-treatment hydrolytic titration values were determined for each heat treatment condition. The second group of glass containers was formed from Type 1B (ASTM definition) 51-expansion borosilicate glass of the same dimensions (3 mL nominal, ~4.9 mL fill capacity). The vials were produced from tubes on the same converting equipment. The vials of the second group were produced using slightly lower temperatures, commensurate with the glass viscosity. Again, vials were used as-is without an initial annealing step. The thermal treatments were performed on new (unused and unfilled) glass containers in as-formed condition.

The first and second groups of glass containers were thermally treated by placing the glass containers in a kiln and heating the glass containers to the desired treatment temperature. Each of the five sets of glass containers were thermally treated at different treatment temperatures ranging from 600° C. to 800° C. (i.e., 600° C., 650° C., 700° C., 750° C., and 800° C.), each treatment temperature being at least 20° C. above the annealing temperature of the glass containers. Individual glass containers of each set were thermally treated for different treatment times ranging from 0.5 hours to 4 hours (i.e., 0.5 hr., 1 hr., 2 hrs., and 4 hrs.). Following thermal treatment, the glass containers were annealed. Thereafter, the hydrolytic titration value of the individual glass containers at each treatment temperature/treatment time was determined according to the "Surface Glass Test" described in USP <660> as described herein. The hydrolytic titration values for each glass container of each set are plotted in FIG. 7 as a function of treatment time.

Figure 7:
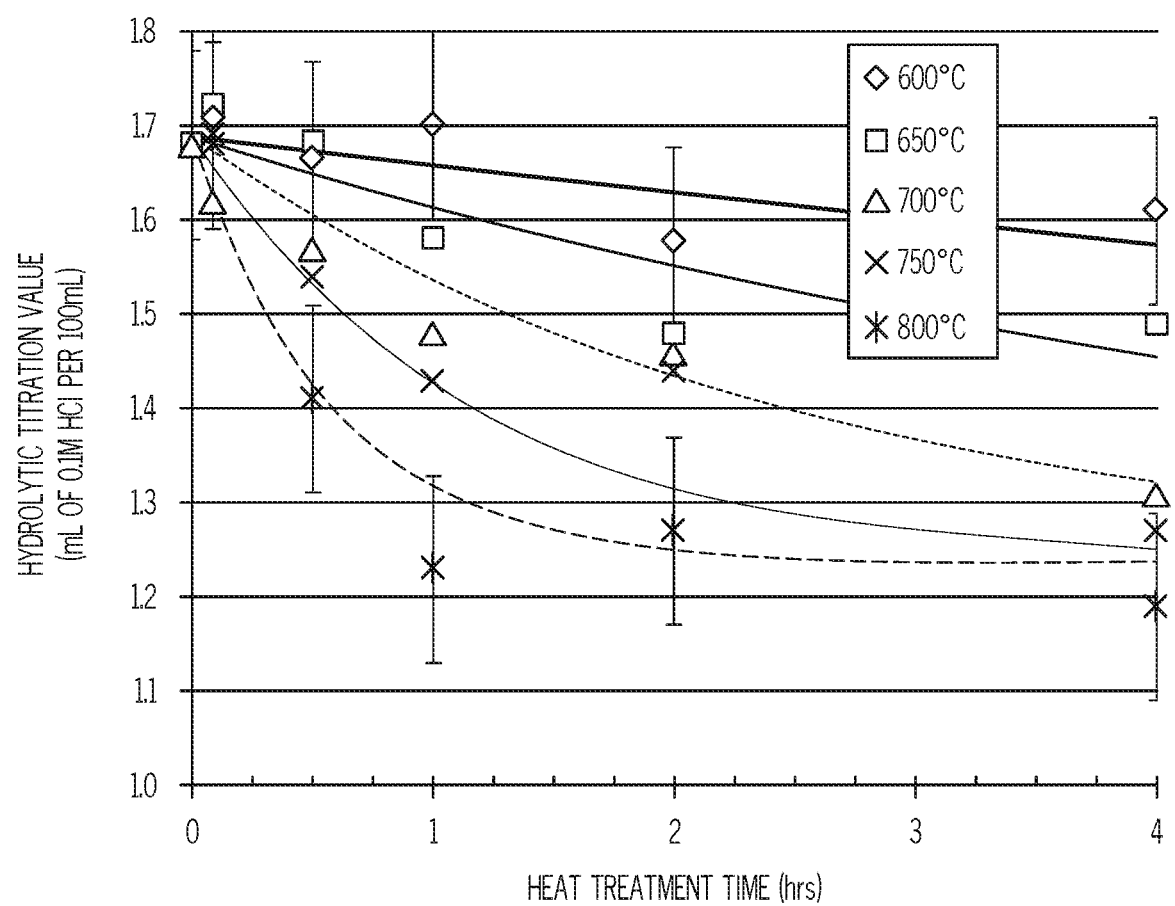
FIG. 7 graphically depicts the post-treatment hydrolytic titration value as a function of time for glass containers heat treated at various temperatures.

FIG. 7 graphically depicts the hydrolytic titration value of the glass containers of the first group as a function of the heat treatment time. The data generally shows that providing thermal energy to the glass encourages the diffusion of soluble species into the thickness of the glass and away from the interior surface of the glass container, thereby reducing the propensity of such species to leach from the glass and degrade the surface hydrolytic resistance of the interior surface of the glass container. Specifically, the data show that, for a given treatment temperature, lower hydrolytic titration values (corresponding to better surface hydrolytic resistance) were achieved with longer treatment times. This indicates that, for a given treatment temperature, longer treatment times result in a greater decrease in the concentration of the soluble species on the interior surface of the glass. The data also show that, for a given treatment time, lower hydrolytic titration values (corresponding to better surface hydrolytic resistance) were achieved with higher treatment temperatures. This indicates that, for a given treatment time, greater treatment temperatures result in a greater decrease in the concentration of the soluble species on the interior surface of the glass. Collectively, the data shows that the surface hydrolytic resistance can be maximized by increasing both the treatment time and the treatment temperature.

Figure 9:
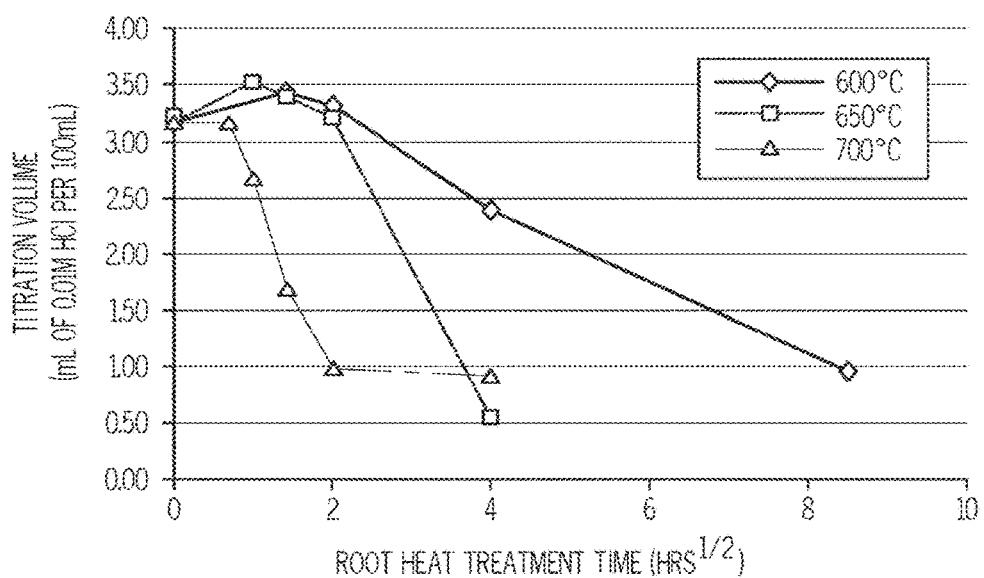
FIG. 9 graphically depicts the post-treatment hydrolytic titration value as a function of time for glass containers heat treated at various temperatures.

FIG. 9 graphically depicts the hydrolytic titration value of the glass containers of the second group as a function of the heat treatment time. The response to thermal treatment of the second group of glass containers (i.e., the borosilicate glass containers) is different than the first group (i.e., the alkali aluminosilicate glass containers). Specifically, FIG. 9 shows an initial increase in hydrolytic titration value for short heat treatment times, indicating that the chemical durability of the borosilicate glass actually degrades, at least initially. Then, above some threshold time (which threshold value decreases with increasing treatment temperature), the hydrolytic titration value decreases as the heterogeneities diffuse and react into the surface of the glass and produce a homogeneous surface, improving the chemical durability of the glass container. Based on this data, it has now been determined that higher heat treatment times and/or longer heat treatment temperatures will actually improve the chemical durability of the glass.

Example 2

To illustrate the effect of a standard annealing treatment on inorganic surface deposits on the interior of a vial, D-SIMS measurements were conducted at three different locations of a glass container formed from Type 1B (ASTM definition) 51-expansion borosilicate glass, as described above with respect to Example 1. The glass container was annealed at the annealing temperature (560° C.) for 0.25 hour prior to D-SIMS measurements.

Figure 8:
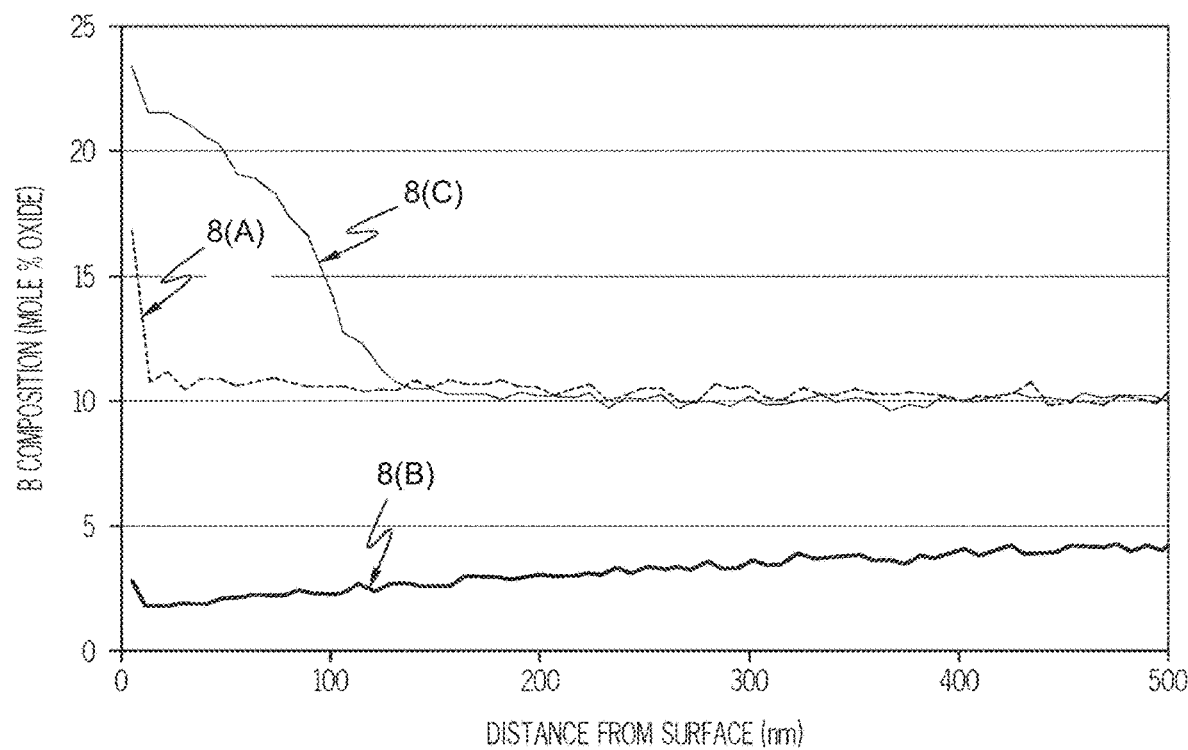
FIG. 8 graphically depicts the composition as a function of depth from the inner surface of an annealed glass container formed from ASTM Type 1B borosilicate glass.

FIG. 8 below shows D-SEVIS measurements for the annealed (not heat treated) vial with reaction-front incorporation of boron in the heel region of the vial. The plot shows molar concentration of boron oxide as a function of depth from the vial interior surface (nanometers of depth). Three different profiles are shown: 8(A) a profile of the sidewall composition above the heel indicates minor enrichment of boron in the outer 10 nm of the surface; 8(B) a profile of the base or bottom composition indicates substantial boron depletion extending several micrometers below the surface of the base before reaching the bulk composition concentrations; and 8(C) a profile of the heel composition indicates pronounced enrichment of boron and a step-like reaction front of the deposit into the glass network. This data also indicates that conventional annealing treatments are not sufficient to diffuse the inorganic deposit into the remainder of the composition.

Based on the foregoing, it should be understood that the methods described herein may be used to improve the surface hydrolytic resistance of glass containers, making the glass containers less susceptible to hydrolytic degradation. While not wishing to be bound by theory, it is believed that when such glass containers are used to contain solutions such as, for example, parenteral pharmaceuticals, the improvement in surface hydrolytic resistance may reduce or mitigate the degradation of the parenteral pharmaceutical contained therein, possibly extending the shelf-life of the pharmaceutical.

While specific reference is made herein to glass containers, it should be understood that the methods described herein are effective to improve the surface hydrolytic resistance of glass articles having various geometries and form factors, including plates, rods, tubes, and the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for increasing the hydrolytic resistance of a glass article, the method comprising:
    providing a glass article with a pre-treatment hydrolytic titration value and comprising a glass surface layer having inorganic deposits; and
    thermally treating the glass article at a treatment temperature at least 20° C. greater than the annealing temperature of the glass article and less than a softening point of the glass article for a treatment time greater than or equal to about 0.25 hours such that species forming the inorganic deposits of the glass surface layer diffuse into the glass and, after thermally treating the glass article, the glass article has a post-treatment hydrolytic titration value that is less than the pre-treatment hydrolytic titration value.

2. The method of claim 1, wherein:
    prior to thermally treating, the surface of the glass article with the glass surface layer has a persistent layer heterogeneity relative to a midpoint within a thickness of the glass article, wherein an extrema in a layer concentration of each constituent component in the glass surface layer is less than about 80% or greater than about 120% of a concentration of a same constituent component at the midpoint prior to thermally treating; and
    after thermally treating, an extrema in the layer concentration of each constituent component in the glass surface layer is greater than or equal to 80% or less than or equal to about 120% of the concentration of the same constituent component at the midpoint after thermally treating.

3. The method of claim 2, wherein after thermally treating an extrema in the layer concentration of each constituent component in the glass surface layer is greater than or equal to 92% or less than or equal to about 108% of the concentration of the same constituent component at the midpoint.

4. The method of claim 1, wherein a surface of the glass article comprises a surface region extending over the surface of the glass article to a depth from about 10 nm to about 50 nm from the surface of the glass article; and
    for a discrete point on the surface of the glass article, an extrema of a surface concentration of each constituent component of the glass article in the surface region at the discrete point is greater than or equal to about 70% and less than or equal to about 130% of a same constituent component in the surface region at any second discrete point on the surface of the glass article after thermally treating.

5. The method of claim 1, wherein the treatment time is greater than or equal to about 1 hour.

6. The method of claim 1, wherein the glass article is formed from an alkali aluminosilicate glass.

7. The method of claim 1, wherein the glass article is formed from a borosilicate glass.

8. The method of claim 1, wherein the glass article is formed from a Type I, Class A or a Type I, Class B glass according to ASTM Standard E438-92.

9. The method of claim 1, wherein the glass article has a Type I hydrolytic resistance under USP <660> after the thermal treating.

10. The method of claim 1 wherein the glass article is a pharmaceutical container.

11. A method for increasing the hydrolytic resistance of a glass article, the method comprising:
    providing a glass article with at least one surface having a glass surface layer with a composition that is different than a composition at a midpoint of a thickness of the glass article, the at least one surface having a pre-treatment hydrolytic titration value; and
    diffusing species from the glass surface layer into the thickness of the glass article to homogenize the surface glass layer relative to the midpoint of the thickness of the glass article such that, after diffusing, the at least one surface of the glass article has a post-treatment hydrolytic titration value which is less than the pre-treatment hydrolytic titration value, wherein diffusing species within the surface glass layer comprises thermally treating the glass article at a temperature at least 20° C. greater than an annealing temperature of the glass article and less than a softening point of the glass article.

12. The method of claim 11, wherein the glass article is thermally treated for at least 0.25 hours.

13. The method of claim 11, wherein the glass article is thermally treated for at least 1 hour.

14. The method of claim 11, wherein:
    prior to diffusing the species, the glass surface layer has a persistent layer heterogeneity relative to the midpoint of the thickness of the glass article, wherein an extrema in a layer concentration of each constituent component in the glass surface layer is less than about 80% or greater than about 120% of a bulk concentration of a same constituent component at the midpoint; and
    after diffusing the species, an extrema in the layer concentration of each constituent component in the glass surface layer is greater than or equal to 80% or less than or equal to about 120% of a concentration of the same constituent component at the midpoint.

15. The method of 14, wherein after diffusing the species an extrema in the layer concentration of each constituent component in the glass surface layer is greater than or equal to 92% or less than or equal to about 108% of a concentration of the same constituent component at the midpoint.

16. The method of claim 11, wherein the at least one surface of the glass article comprises a surface region extending over the at least one surface of the glass article to a depth from about 10 nm to about 50 nm from the at least one surface of the glass article; and
    for a discrete point on the at least one surface of the glass article, an extrema of a surface concentration of each constituent component of the glass article in the surface region at the discrete point is greater than or equal to about 70% and less than or equal to about 130% of a same constituent component in the surface region at any second discrete point on the at least one surface of the glass article after diffusing the species.

17. The method of claim 11 wherein the glass article is a pharmaceutical container.

\* \* \* \* \*

UNITED STATES PATENT AND TRADEMARK OFFICE
CERTIFICATE OF CORRECTION

PATENT NO. : 10,669,196 B2  
APPLICATION NO. : 15/541238  
DATED : June 2, 2020  
INVENTOR(S) : Keith Raymond Gaylo et al.

Page 1 of 1

It is certified that error appears in the above-identified patent and that said Letters Patent is hereby corrected as shown below:

On the Title Page

In Column 2, item (57), Abstract, Line 6, delete "200 C" and insert -- 20° C --, therefor.

On page 2, in Column 2, item (56), Other Publications, Line 2, delete "20171254." and insert -- 2017125444. --, therefor.

In the Claims

In Column 20, Line 50 (approx.), Claim 15, after "of" insert -- claim --.

Signed and Sealed this  
Eighth Day of September, 2020

Andrei Iancu  
*Director of the United States Patent and Trademark Office*